United States Patent [19]
White

[11] Patent Number: 5,150,568
[45] Date of Patent: Sep. 29, 1992

[54] CONTROL AND PROTECTION SYSTEM FOR TURBINE ENGINES CONTAINED WITHIN A PROTECTIVE HOUSING

[75] Inventor: Robert C. White, San Diego, Calif.

[73] Assignee: Sundstrand Corporation, Rockford, Ill.

[21] Appl. No.: 834,986

[22] Filed: Feb. 14, 1992

Related U.S. Application Data

[63] Continuation of Ser. No. 769,471, Oct. 1, 1991, abandoned, which is a continuation of Ser. No. 497,714, Mar. 23, 1990, abandoned.

[51] Int. Cl.⁵ .................................................. F02C 7/32
[52] U.S. Cl. .................................. 60/39.31; 60/39.33; 290/1 A
[58] Field of Search .................. 60/39.24, 39.27, 39.31, 60/39.33, 39.83, 39.142, 39.091; 290/1 A, 40 A, 40 B, 40 C; 244/53 A, 58

[56] References Cited

U.S. PATENT DOCUMENTS

| | | | |
|---|---|---|---|
| 3,011,313 | 12/1961 | Horton | 60/39.83 |
| 3,462,949 | 8/1969 | Anderson et al. | 60/39.31 |
| 4,019,315 | 4/1977 | Yannone et al. | 290/40 A |
| 4,147,029 | 4/1979 | Sargisson | 60/39.31 |

FOREIGN PATENT DOCUMENTS

| | | | |
|---|---|---|---|
| 210232 | 9/1986 | Japan | 60/39.31 |
| 1212109 | 11/1970 | United Kingdom | 60/39.31 |

OTHER PUBLICATIONS

"General Electric Heavy-Duty Gas Turbines—7001" Product Brochure by G. E. Co.; Mar, 1977, p. 12.

*Primary Examiner*—Louis J. Casaregola
*Attorney, Agent, or Firm*—Antonelli, Terry, Stout & Kraus

[57] ABSTRACT

A control (100) for a turbine engine (104) contained in a power unit in accordance with the invention includes a housing (103) mounted on a surface (11) containing the turbine; a power takeoff (106) providing rotary power from the turbine into the housing; an electrical power generator (108) contained within the housing which is driven by the power takeoff for providing electrical power within the housing; at least one sensor (16, 18, 20 and 22) for sensing an operational parameter of the turbine engine; and a controller (119) contained within the housing, for controlling operation of the turbine engine in response to signals coupled to the control from at least one sensor.

25 Claims, 3 Drawing Sheets 5,150,568

CONTROL AND PROTECTION SYSTEM FOR TURBINE ENGINES CONTAINED WITHIN A PROTECTIVE HOUSING

This application is a continuation of application Ser. No. 07/769,471, filed Oct. 1, 1991 (abandoned), which is a continuation of Ser. No. 07/497,714, filed Mar. 23, 1990 (abandoned).

TECHNICAL FIELD

The present invention relates to control and protection systems for gas turbine engines. More particularly, the present invention relates to control and protection systems for turbine engines having reduced cost, weight, and protection against physical impact, electromagnetic interference (EMI) and electromagnet pulse (EMP).

BACKGROUND ART

FIG. 1 illustrates a prior art auxiliary power unit 10 of the type manufactured by the assignee of the present invention. The power unit 10 has a plurality of electrical and mechanical elements located at distributed locations on the outside surface 11 of the power unit. The power unit has a plurality of electrical communication lines 35, 38 and 40 which interconnect an electronic control unit 12, a condition monitor panel 14, sensors 16–20 and fuel control 24. A conventional gas turbine engine (not illustrated) is located within the envelope defined by the outside surface 11.

FIG. 2 illustrates a prior art control system for a turbine engine of a power unit of the type illustrated in FIG. 1 and manufactured by the assignee of the present invention for use as an auxiliary power unit (APU), integrated power unit (IPU), and/or an emergency power unit (EPU). Like reference numerals in FIGS. 1 and 2 identify like parts. A turbine engine (not illustrated) has a plurality of electrical and mechanical control elements mounted at distributed locations within or on the exterior surface of the power unit. The engine has numerous electrical communication lines connecting the distributed elements as described below. As a consequence of the turbine engine being utilized in airframe applications, overall weight is significant in the operational efficiency of the airframe. Additionally, the overall size of the turbine engine including electrical and mechanical controls is significant in achieving efficient space utilization in an airframe.

Poor space utilization, increased expense and increased weight are a consequence of the distribution of the control system as illustrated in FIGS. 1 and 2. The electronic control assembly 12 containing a programmed microprocessor is interfaced with the condition monitor panel 14. The condition monitor panel 14 contains a plurality of visual indicators 15 which signal the status of built-in test equipment (BITE), an hourmeter 17 and a start counter 19. The condition monitor panel 14 is interfaced with a plurality of sensors which include a speed pickup 16, an oil pressure sensor 18, a pair of thermocouples 20, respectively sensing exhaust gas temperature (EGT) at different locations in the exhaust gas stream produced by the turbine, and an oil temperature sensor 22. Fuel control assembly 24 contains a plurality of fuel control valves. A start control valve 26 controls the flow of fuel for a starting sequence used to start the turbine engine. A main control fuel valve 28 controls the flow of fuel for controlling the operation of the turbine engine. A return fuel control valve 30 controls the return of fuel to the fuel tank (not illustrated). A fuel inlet 32 couples fuel from the fuel tank to the aforementioned valves 26–30. A fuel outlet 33 couples fuel back to the fuel tank. Operation of the fuel control is conventional. The electronic control assembly 12 and condition monitor panel 14 are wired to receive electrical power applied from either a battery or an electrical power generator (not illustrated). Electrical power is applied to the electronic control assembly 12 and condition monitor panel 14 by electrical power line 34 connected to the battery or electrical power generator.

A significant expense in the overall cost of the turbine engine and a reliability problem are the electrical communication lines connecting the distributed elements together and the overvoltage protectors and high frequency filters which are connected to the electrical communication lines at the point of entry to the electronic control 12. A plurality of electrical communication lines interconnect the electronic control assembly 12, condition monitor panel 14, sensors 16–22 and fuel control valves 28–30. A multiple wire communication line 35 connects the electronic control assembly 12 and the condition monitor panel 14. An overvoltage protector 36 is coupled to each one of the individual communication lines 35 to protect the electronic control assembly 12 from high voltage conditions caused by EMP or a lightning strike which could produce a high electrical voltage that could damage or destroy the electronic control assembly. Communication lines 38 couple the sensors 16–22 to the condition monitor panel 14. Communication lines 40 couple control signals produced by a control program stored in the electronic control assembly 12 to the valves 26–30 of the fuel control assembly 24 to control the fuel flow to the turbine engine. A filter assembly 41 comprised of an inductor and a pair of capacitors shunting first and second terminals of the inductor to ground is connected in series with each of the communication lines 35 to filter high frequency noise (EMI or RFI) to ground originating from diverse locations in the power unit such as the elements 16–22. The overvoltage protectors 36 and the filter assembly 41 are conventionally mounted within the EMI tight housing containing the electronic control 12 which adds appreciable weight. Furthermore, the overvoltage protectors and filters 41 within the housing of the electronic control 12 may cost up to 30% of the overall cost of the power unit.

Each of the valves 26, 28 and 30 is driven by a power switch (not illustrated) within the electronic control 12. The power switch driving each of the valves 26, 28 and 30 has an overload protection circuit which turns off the power switch when a short circuit exists in the solenoid control of the valves. Short circuits producing an overload on the switches can be caused by damage to exposed communication lines 40. The overload protection circuit adds weight, may represent up to 5% of the overall cost of the power unit and adds complexity with attendant reliability problems.

As illustrated in FIG. 1, the electronic control assembly 12, condition monitor panel 14, sensors 16–22 and fuel control 24 are physically mounted at different locations on the outside surface 11 of the power unit 10. As a consequence of the distribution of these elements on different locations of the power unit 10, the necessary electrical communication lines and fuel lines add weight to the power unit. Additionally, mounting of the aforementioned components on the exterior surface 11 of the power unit is complicated in that it is difficult to find surfaces well suited for the mounting of these parts which do not interfere with the operation of the engine and do not add substantial size to the outside envelope of the power unit. Finally, a reduction of the distributed components greatly reduces the number of line replaceable units. Each of the elements 14–22 are line replaceable units. Specifications regarding the prior art require built-in test equipment inside the electronic control 14 for each line replaceable unit which adds complexity, weight and cost.

DISCLOSURE OF INVENTION

The present invention provides a control system for a turbine engine which is less expensive, smaller in volume, lighter in weight and more reliable than the prior art control system described above with reference to FIG. 1. A turbine control system of the present invention is protected against damage from EMI, RFI, EMP and mechanical impact. With the invention, distributed elements of the control system described above with reference to FIGS. 1 and 2 are contained within a single housing. By mounting of the components described above with respect to FIGS. 1 and 2 in a single housing, the electrical communication paths are short between the enclosed parts saving weight. Filters, overload protection circuits, and overvoltage protection devices are eliminated with respect to all communication lines which are located completely within the housing. Finally, the present invention improves the overall reliability of the operation of the power unit by reducing exposed electrical communications and fuel lines and eliminating filters and overvoltage protection devices which are subject to damage which can lead to overall failure in the control of the power unit. The housing containing the power unit control may be located on an exterior surface of the turbine engine where the condition monitor panel was located in the prior art as illustrated in FIG. 1 or where the fuel control assembly is located.

A control for a power unit of an airframe including a prime mover providing output power to the airframe in accordance with the present invention includes a housing mounted on an exterior surface of the prime mover; a power takeoff providing rotary power from the prime mover into the housing; an electrical power generator contained within the housing which is driven by the power takeoff for providing electrical power within the housing; at least one sensor mounted within the housing for sensing an operational parameter of the prime mover; at least one electrical communication line between the at least one sensor within the housing and the controller with the at least one electrical communication line being electrically isolated from a filter, a voltage protection device and an overcurrent protection device and controller contained within the housing, for controlling operation of the prime mover in response to signals coupled to the controller from the at least one sensor mounted within the housing. The invention includes at least one sensor mounted outside the housing and an electrical communication line between the at least one sensor contained outside the housing and the controller is contained within the housing. A fuel pump, contained within the housing, is driven by the power takeoff by a coupling within the housing. The controller comprises an integrated condition monitor panel and an electronic control contained within the housing with a plurality of indicators and at least one meter being visible through a wall of the housing. A fuel control is contained within the housing having at least one valve controlled by signals coupled from the controller to the fuel control contained within the housing and a fuel input coupled to the at least one valve and a fuel output coupled to the at least one valve and to the prime mover. The prime mover may be a turbine contained in an airframe.

The invention may further comprise a compressor bleed air control contained within the housing which is coupled to a source of compressor bleed air; an inlet temperature probe coupled to inlet air to the prime mover through a wall of the housing to the controller with control of the prime mover being a function of the inlet temperature sensed by the probe; and a compressor discharge pressure sensor disposed within the housing coupled pneumatically to air discharged from the compressor through a wall of the housing to the controller with control of the prime mover being a function of pressure sensed by the sensor.

BEST MODE FOR CARRYING OUT THE INVENTION

Figure 1:
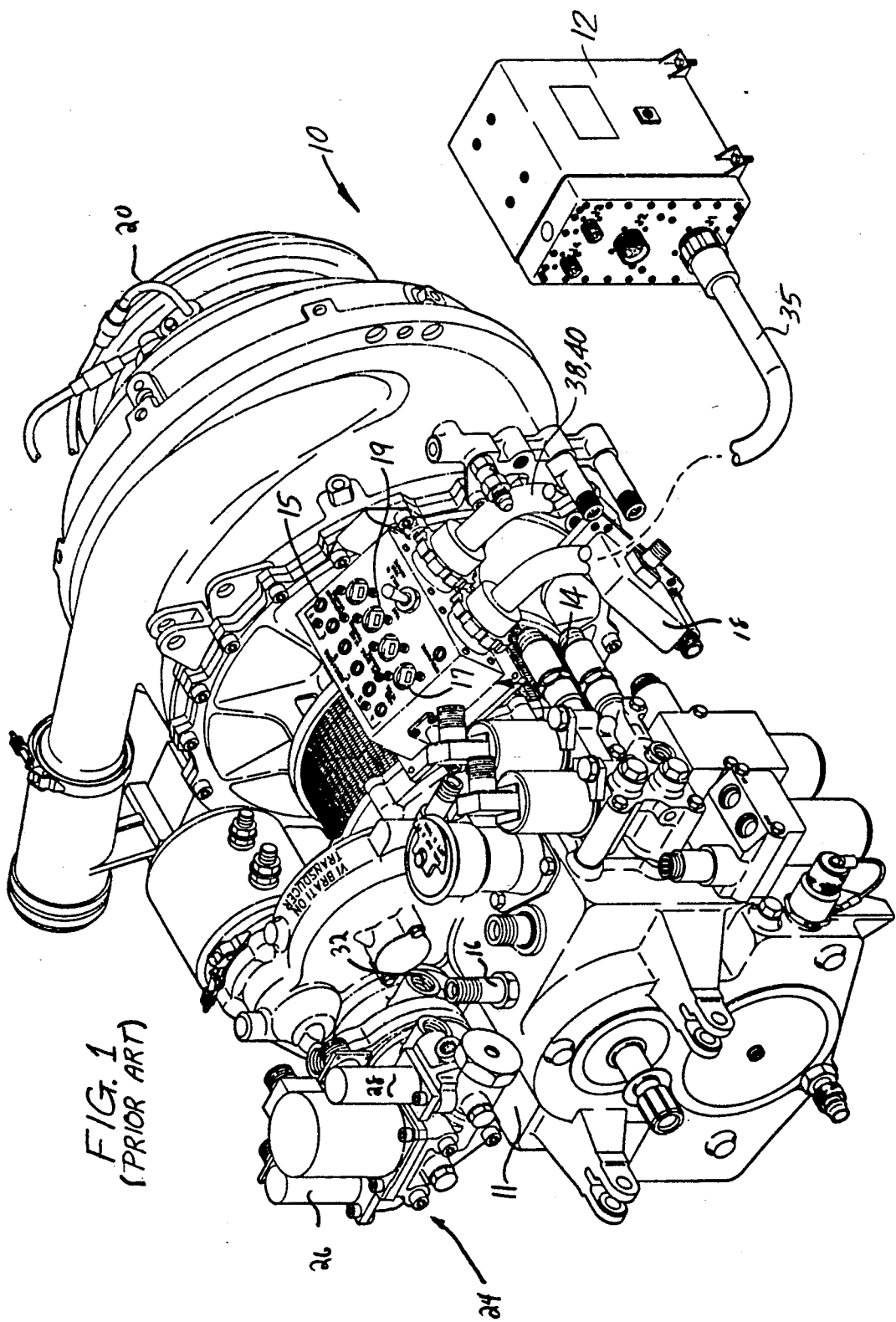
FIG. 1 illustrates a prior art auxiliary power unit of the type manufactured by the assignee of the present invention.
Figure 2:
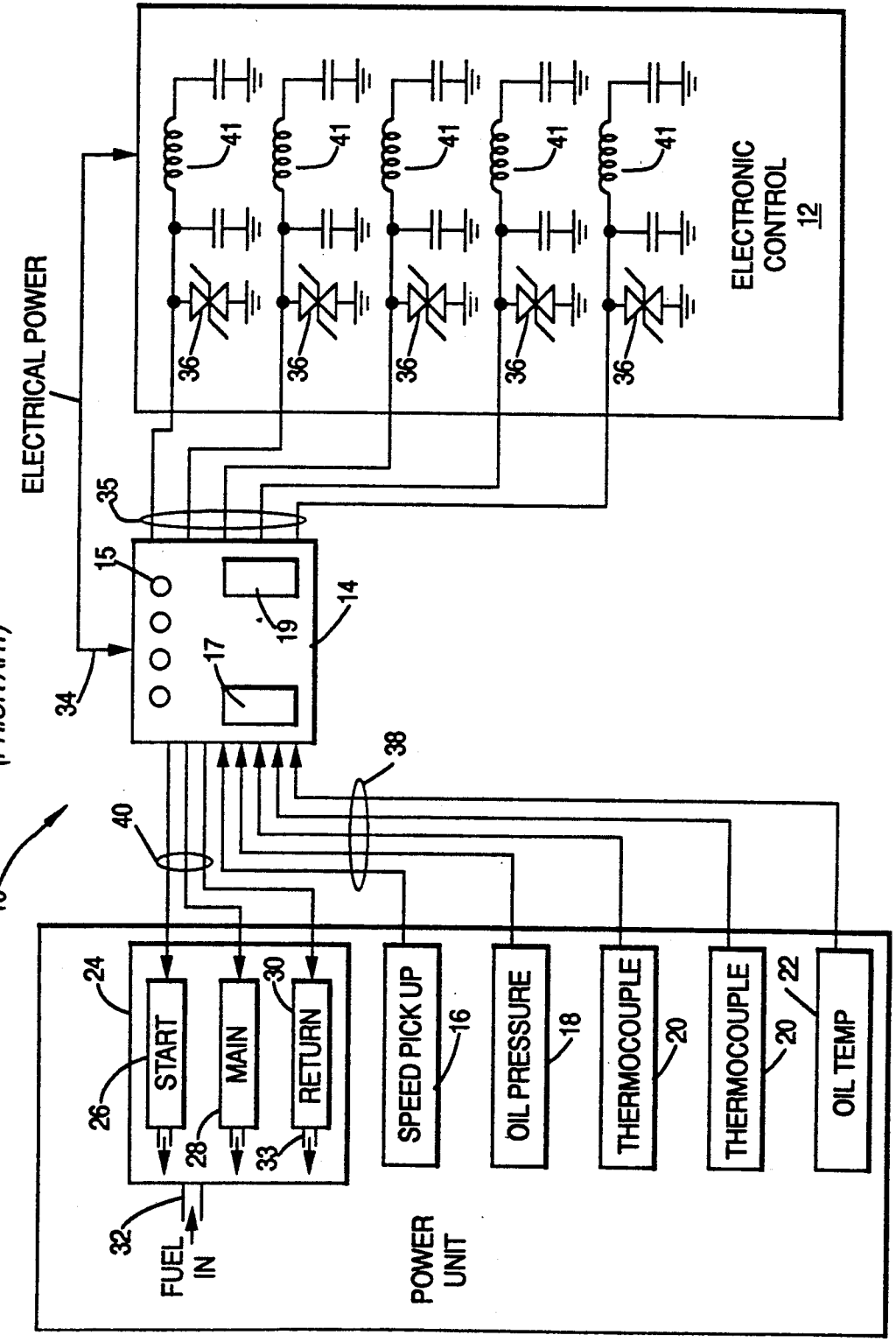
FIG. 2 illustrates a prior art control for a turbine engine of the manufactured by the assignee of the present invention.
Figure 3:
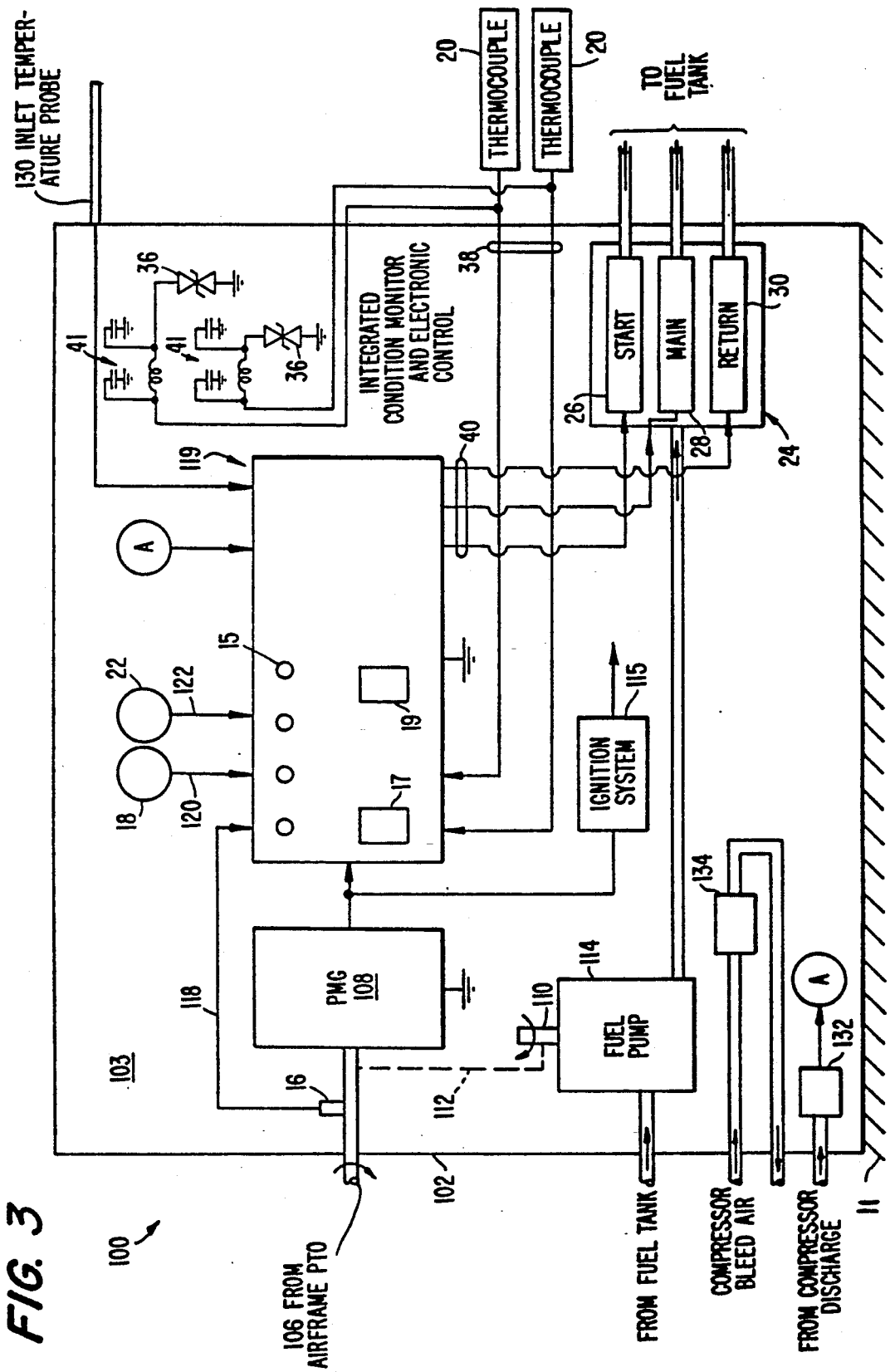
FIG. 3 illustrates an embodiment of the present invention.

FIG. 3 illustrates an embodiment 100 in accordance with the present invention. Like reference numerals identify like parts in FIGS. 1–3. A housing 102 is mounted on an exterior surface of a power unit such as an APU, EPU or IPU or an airframe propulsion engine. The function of the housing 102 is to contain and protect as many of the sensors and control functions of the power unit and turbine as is possible to eliminate electrical communications external to the housing and electronic circuitry which was necessary in the prior art as a consequence of the distribution of the control functions on the outside surface of the power unit. The housing 102 may be mounted on a power unit as illustrated in FIG. 1 at the position of the condition monitor panel 14 or the fuel control assembly 24 with the functions of the electronic control 12 and condition monitor panel 14 being integrated into a single controller 119 as described below. A power takeoff 106 is coupled through a wall 102 into the housing 103 to an electrical power generator 108 which may be a permanent magnet generator not requiring battery excitation and to a fuel pump 110 of conventional construction. Link 112 couples the power takeoff 106 to the drive shaft 110 of fuel pump 114 by any suitable coupling mechanism symbolized by the dotted line 12. In a preferred application, the PMG 108 and fuel pump 114 are mounted on a common shaft with the link 112 being illustrated to simplify the illustration. Location of the electrical power generator 108 completely within the housing 102 provides "black start" capability which requires no external electrical excitation and eliminates a path for external interference into the control. Electrical power is applied by power line 117 to the integrated condition monitor and electronic control 119. The permanent magnet generator applies electrical power to ignition system 115 which may be any conventional ignition system designed for the particular prime mover being used.

An important aspect of the present invention is substantially eliminating communication lines external to the housing 102 by locating many electrical communication paths completely within the housing and eliminating electrical filters, overcurrent protection devices and high voltage protection devices. The communication line 118, which couples the speed sensor 16 to the control 119; the communication line 120, which couples the oil pressure sensor 18 to the control; and the communication line 122, which couples the oil temperature sensor 22 to the control do not require high voltage protection devices 36 or filters 41 as a consequence of their shielding being provided by the housing 102. The controller 119 integrates the functions of the condition monitor panel 14 and electronic control 12 of the prior art into a single assembly thereby eliminating one housing. The indicators 15 and meters 17 and 19 are visible through the wall 102 of the housing 103. The filters of the prior art for eliminating high frequency electrical noise have been eliminated as a consequence of the shielding provided by the housing 103. Elimination of the high voltage protection devices 36 and filters 41 and overcurrent protection devices substantially lessens the overall cost of the control. The inclusion of the speed pickup 16, the oil pressure sensor 18 and oil temperature sensor 22 within the housing eliminates the need for overcurrent protection devices which are necessary when these devices have exposed electrical communication lines 40 as in the prior art are not protected by a housing.

Optionally, additional devices may be included within the housing 103. A temperature probe 130, which may be a conventional stainless steel probe, is thermally coupled to the inlet temperature of the turbine 104 and electrically coupled to the control 119. The operation of the engine is controlled as a function of the sensed inlet temperature in conventional fashion. A pressure transducer 132 is pneumatically coupled to the outlet of the compressor (not illustrated) of the turbine and to the controller 119. The operation of the prime mover is controlled as a function of the sensed turbine pressure in conventional fashion. Bleed air control is accomplished by a pilot valve 134 pneumatically coupled to the compressor. The housing 103 protects the pressure transducer 132 and pilot valve 134.

While the invention has been described in terms of its preferred embodiment, it should be understood that numerous modifications may be made thereto without departing from the spirit and scope of the invention. It is intended that all such modifications fall within the scope of the appended claims.

I claim:

1. A control for a power unit of an airframe including a prime mover providing non-propulsive output power to the airframe comprising:
    a housing mounted on an exterior surface of the prime mover;
    a power takeoff providing rotary power from the prime mover into the housing;
    an electrical power generator contained within the housing which is driven by the power takeoff for providing electrical power within the housing;
    at least one sensor mounted within the housing for sensing an operational parameter of the prime mover;
    at least one electrical communication line between the at least one sensor within the housing and the controller with the at least one electrical communication line being electrically isolated from a filter, a voltage protection device and an overcurrent protection device and
    a controller contained within the housing for controlling operation of the prime mover in response to signals coupled to the control from the at least one sensor mounted within the housing.

2. A control in accordance with claim 1 further comprising:
    at least one sensor mounted outside the housing; and
    an electrical communication line between the at least one sensor mounted outside the housing and the controller contained within the housing.

3. A control in accordance with claim 2 further comprising:
    a fuel pump contained within the housing driven by the power takeoff by a coupling within the housing.

4. A control in accordance with claim 2 wherein the controller comprises:
    an integrated condition monitor panel and an electronic control contained within the housing with a plurality of indicators and at least one meter being visible through a wall of the housing.

5. A control in accordance with claim 3 wherein the controller comprises:
    an integrated condition monitor panel and an electronic control contained within the housing with a plurality of indicators and at least one meter being visible through a wall of the housing.

6. A control in accordance with claim 2 further comprising:
    a fuel control contained within the housing having at least one valve controlled by the controller by signals coupled from the controller to the fuel control over at least one communication line contained within the housing and a fuel input coupled to the at least one valve and a fuel output coupled to the at least one valve and to the prime mover.

7. A control in accordance with claim 3 further comprising:
    a fuel control contained within the housing having at least one valve controlled by the controller by signals coupled from the controller to the fuel control over at least one communication line contained within the housing and a fuel input coupled to the fuel pump and the at least one valve and a fuel output coupled to the at least one valve and to the prime mover.

8. A control in accordance with claim 4 further comprising:
    a fuel control contained within the housing having at least one valve controlled by the controller by signals coupled from the controller to the fuel control over at least one communication line contained within the housing and a fuel input coupled to the at least one valve and a fuel output coupled to the at least one valve and to the prime mover.

9. A control in accordance with claim 5 further comprising:
    a fuel control contained within the housing having at least one valve controlled by the controller by signals coupled from the controller to the fuel control over at least one communication line contained within the housing and a fuel input coupled to the fuel pump and the at least one valve and a fuel output coupled to the at least one valve and to the prime mover.

10. A control in accordance with claim 2 further comprising:
a compressor bleed air control contained within the housing which is coupled to a source of compressor bleed air.

11. A control in accordance with claim 2 further comprising:
an inlet temperature probe coupled to inlet air to the prime mover and through a wall of the housing to the controller with control of the prime mover being a function of inlet temperature sensed by the probe.

12. A control in accordance with claim 2 further comprising:
a compressor discharge pressure sensor disposed within the housing coupled pneumatically to air discharged from the compressor through a wall of the housing and to the controller with control of the prime mover being a function of pressure sensed by the sensor.

13. A control in accordance with claim 3 further comprising:
a compressor bleed air control contained within the housing which is coupled to a source of compressor bleed air.

14. A control in accordance with claim 3 further comprising:
an inlet temperature probe coupled to inlet air to the turbine and through a wall of the housing to the controller with control of the turbine being a function of inlet temperature sensed by the probe.

15. A control in accordance with claim 3 further comprising:
a compressor discharge pressure sensor disposed within the housing coupled pneumatically to air discharged from the compressor through a wall of the housing and to the controller with control of the turbine being a function of pressure sensed by the sensor.

16. A control in accordance with claim 4 further comprising:
a compressor bleed air control contained within the housing which is coupled to a source of compressor bleed air.

17. A control in accordance with claim 4 further comprising:
an inlet temperature probe coupled to inlet air to the turbine and through a wall of the housing to the controller with control of the turbine being a function of inlet temperature sensed by the probe.

18. A control in accordance with claim 4 further comprising:
a compressor discharge pressure sensor disposed within the housing coupled pneumatically to air discharged from the compressor through a wall of the housing and to the controller with control of the turbine being a function of pressure sensed by the sensor.

19. A control in accordance with claim 5 further comprising:

a compressor bleed air control contained within the housing which is coupled to a source of compressor bleed air.

20. A control in accordance with claim 5 further comprising:
an inlet temperature probe coupled to inlet air to the turbine and through a wall of the housing to the controller with control of the turbine being a function of inlet temperature sensed by the probe.

21. A control in accordance with claim 5 further comprising:
a compressor discharge pressure sensor disposed within the housing coupled pneumatically to air discharged from the compressor through a wall of the housing and to the controller with control of the turbine being a function of pressure sensed by the sensor.

22. A control in accordance with claim 2 further comprising:
a compressor bleed air control contained within the housing which is coupled to a source of compressor bleed air;
an inlet temperature probe coupled to inlet air to the turbine and through a wall of the housing to the controller with control of the turbine being a function of inlet temperature sensed by the probe; and
a compressor discharge pressure sensor disposed within the housing coupled pneumatically to air discharged from the compressor through a wall of the housing and to the controller with control of the turbine being a function of pressure sensed by the sensor.

23. A control in accordance with claim 3 further comprising:
a compressor bleed air control contained within the housing which is coupled to a source of compressor bleed air;
an inlet temperature probe coupled to inlet air to the turbine and through a wall of the housing to the controller with control of the turbine being a function of inlet temperature sensed by the probe; and
a compressor discharge pressure sensor disposed within the housing coupled pneumatically to air discharged from the compressor through a wall of the housing and to the controller with control of the turbine being a function of pressure sensed by the sensor.

24. A control in accordance with claim 4 further comprising:
a compressor bleed air control contained within the housing which is coupled to a source of compressor bleed air;
an inlet temperature probe coupled to inlet air to the turbine and through a wall of the housing to the controller with control of the turbine being a function of inlet temperature sensed by the probe; and
a compressor discharge pressure sensor disposed within the housing coupled pneumatically to air discharged from the compressor through a wall of the housing and to the controller with control of the turbine being a function of pressure sensed by the sensor.

25. A control in accordance with claim 5 further comprising:
a compressor bleed air control contained within the housing which is coupled to a source of compressor bleed air;

an inlet temperature probe coupled to inlet air to the turbine and through a wall of the housing to the control with controller of the turbine being a function of inlet temperature sensed by the probe; and a compressor discharge pressure sensor disposed within the housing coupled pneumatically to air discharged from the compressor through a wall of the housing and to the controller with control of the turbine being a function of pressure sensed by the sensor.

* * * * *